US012046859B2

(12) United States Patent
Lamb et al.

(10) Patent No.: US 12,046,859 B2
(45) Date of Patent: *Jul. 23, 2024

(54) METHOD AND APPARATUS OF POWERING AN ELECTRONIC DEVICE USING A REMOVABLE POWER SUPPLY

(71) Applicant: Ecolink Intelligent Technology, Inc., Carlsbad, CA (US)

(72) Inventors: Michael Lamb, Rancho Santa Fe, CA (US); Michael Bailey, Carlsbad, CA (US); Carlo Q. Petrucci, Carlsbad, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 17/367,781

(22) Filed: Jul. 6, 2021

(65) Prior Publication Data

US 2021/0336397 A1 Oct. 28, 2021

Related U.S. Application Data

(62) Division of application No. 16/594,291, filed on Oct. 7, 2019, now Pat. No. 11,056,848, which is a division of application No. 13/676,988, filed on Nov. 14, 2012, now Pat. No. 10,461,485.

(60) Provisional application No. 61/617,016, filed on Mar. 28, 2012.

(51) Int. Cl.
*H01R 31/06* (2006.01)
*H01R 27/00* (2006.01)

(52) U.S. Cl.
CPC ........... *H01R 31/065* (2013.01); *H01R 27/00* (2013.01)

(58) Field of Classification Search
CPC ...... H01R 31/065; H01R 27/00; H01R 31/00; H01R 29/00
See application file for complete search history.

(56) References Cited

U.S. PATENT DOCUMENTS

| | | | | |
|---|---|---|---|---|
| 5,906,506 | A * | 5/1999 | Chang | G06F 1/189 439/500 |
| 6,567,273 | B1 | 5/2003 | Liu et al. | |
| D611,415 | S | 3/2010 | Andre et al. | |
| D623,136 | S | 9/2010 | Andre et al. | |
| 8,382,526 | B2 | 2/2013 | Chen et al. | |
| 8,624,551 | B2 | 1/2014 | Sulem et al. | |
| 8,760,123 | B2 | 6/2014 | Hawawini et al. | |

(Continued)

OTHER PUBLICATIONS

United States Patent & Trademark Office, FINAL Office Action issued in U.S. Appl. No. 16/273,262, Notification date of Dec. 11, 2019, 9 pgs.

(Continued)

*Primary Examiner* — Elim Ortiz
(74) *Attorney, Agent, or Firm* — Greenberg Traurig, LLP

(57) ABSTRACT

An electronic device lacking an internal power supply comprises electronic circuitry, an external power adapter having an input connector for receiving AC power from a conventional AC power outlet and for providing a low-voltage output signal to an output connector, and a first port electronically coupled to the electronic circuitry for receiving the low-voltage output signal from the output connector of the power adapter and for providing the low-voltage output signal to the electronic circuitry.

14 Claims, 6 Drawing Sheets

(56) References Cited

U.S. PATENT DOCUMENTS

| | | | | |
|---|---|---|---|---|
| 8,794,996 | B1 | 8/2014 | Matsuoka | |
| 2001/0015579 | A1* | 8/2001 | Nakagawa | H02J 7/0045 307/150 |
| 2002/0127898 | A1 | 9/2002 | Liu | |
| 2004/0145890 | A1 | 7/2004 | Liao | |
| 2005/0141208 | A1 | 6/2005 | Niinuma | |
| 2006/0199435 | A1 | 9/2006 | Foo et al. | |
| 2006/0267549 | A1 | 11/2006 | Kung | |
| 2007/0091656 | A1 | 4/2007 | Navid et al. | |
| 2008/0012423 | A1 | 1/2008 | Mimran | |
| 2008/0085617 | A1 | 4/2008 | Bevirt | |
| 2008/0211310 | A1* | 9/2008 | Jitaru | H02M 1/10 307/80 |
| 2009/0117765 | A1* | 5/2009 | Wen | H01R 13/514 439/166 |
| 2010/0142597 | A1 | 6/2010 | Zhang et al. | |
| 2010/0213892 | A1 | 8/2010 | DeSanctis | |
| 2010/0225171 | A1* | 9/2010 | Rostami | H01M 10/46 307/66 |
| 2010/0246232 | A1 | 9/2010 | Chen et al. | |
| 2012/0300516 | A1 | 11/2012 | Chen et al. | |
| 2013/0106372 | A1 | 5/2013 | Sawyers | |
| 2014/0300322 | A1 | 10/2014 | Chien | |

OTHER PUBLICATIONS

United States Patent & Trademark Office, Non-Final Office Action issued in U.S. Appl. No. 16/273,262, dated Aug. 21, 2020, 10 pgs.

* cited by examiner

Prior Art

METHOD AND APPARATUS OF POWERING AN ELECTRONIC DEVICE USING A REMOVABLE POWER SUPPLY

CLAIM OF PRIORITY

The present application is a divisional of U.S. application Ser. No. 16/594,291, filed on Oct. 7, 2019, which is a divisional of Ser. No. 13/676,988 filed on Nov. 14, 2012, now U.S. Pat. No. 10,461,485, which claims the benefit of provisional application Ser. No. 61/617,016 filed on Mar. 28, 2012, which is incorporated in its entirety herein.

BACKGROUND

Field of Use

The present application relates to the field of electronics. More specifically, the present application relates to an innovative method and apparatus for powering an electronic device.

Description of the Related Art

Small, household electronic devices have become commonplace in homes and businesses throughout the world. Some of these devices depend on batteries to supply their operating power, while others rely on AC power delivered from common electrical outlets. Devices that rely on AC power typically use a transformer to reduce the voltage from electrical outlets from approximately 110 volts AC to a smaller voltage, such as 24 volts AC, then use diodes and capacitors to produce one or more low-voltage, DC power for use by the electronic device.

Designers of such electronic devices must decide whether to power these devices using batteries or AC power. Batteries allow for a less-complex design, lower bill of material cost, and "clean" DC power, but are limited to low-power devices. AC power is typically used in high power-consuming devices, as batteries do not deliver the power necessary for their operation. AC power is frequently used in low to moderate power-consuming types of products, such as wireless routers, cordless telephones, USB hubs, etc., because relying on batteries would require users to change batteries frequently.

In addition to the drawbacks of increased complexity and increased material costs, AC-powered devices suffer from another drawback: in the United States they must be certified as safe by meeting governmental requirements. This typically requires submission of schematics and other documentation, as well as having to pass a variety of safety testing. The process can be tedious, time-consuming, and expensive.

It would be desirable to power low to moderate power-consuming devices using AC power, without the complexity, cost, and regulatory scrutiny associated with using such power.

SUMMARY

The embodiments described herein relate to an apparatus for providing power to an electronic device lacking an internal power supply. In one embodiment, the apparatus comprises electronic circuitry, and a first port electronically coupled to the electronic circuitry for receiving power from a sealed power adapter having a second, mating port and providing the power to the electronic circuitry.

In another embodiment, an apparatus for providing power to an electronic device lacking an internal power supply comprises electronic circuitry, an external power adapter having an input connector for receiving AC power from a conventional AC power outlet and for providing a low-voltage output signal to an output connector, and a first port electronically coupled to the electronic circuitry for receiving the low-voltage output signal from the output connector of the power adapter and for providing the low-voltage output signal to the electronic circuitry.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present disclosure describes an apparatus and method for powering an electronic device using an external power adapter. The principles described herein can apply to virtually any electronic device, but particularly to electronic devices that consume a moderate amount of power. For example, any electronic device that would ordinarily require frequent battery replacement if the electronic device were to be powered by batteries.

Figure 1:
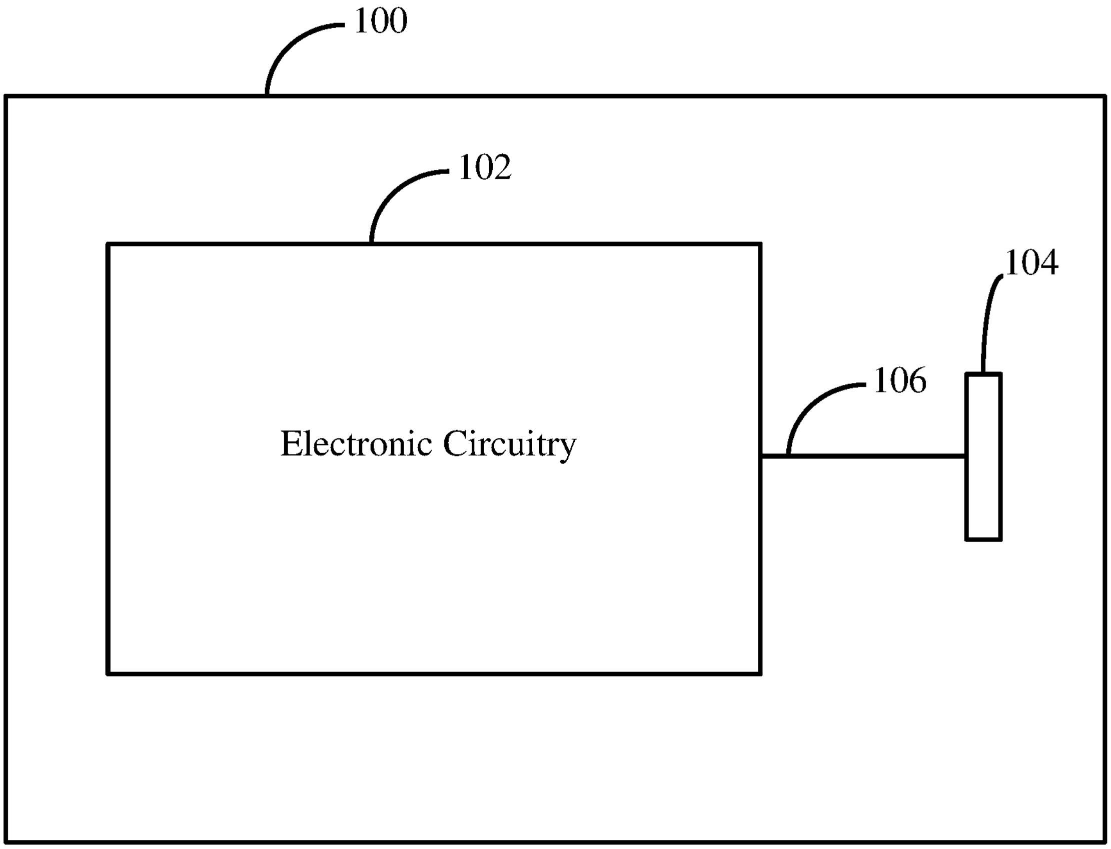
FIG. 1 is a schematic diagram illustrating one embodiment of an electronic device lacking an internal power supply that receives power via an external power adapter.

FIG. 1 is a schematic diagram illustrating one embodiment of an electronic device 100 lacking an internal power supply that receives power via an external power adapter, such as a transformer or other means to convert a relatively large voltage (e.g., 115 VAC) to a relatively low voltage (e.g., 10 VDC, 24 VAC). In one embodiment, electronic device 100 comprises a security device used to relay communication signals from a source to a destination. For example, electronic device 100 may comprise a dual-transceiver that transmits and receives RF signals using a first communication protocol to/from a first remote device and transmits and receives RF signals using a second communication protocol to/from a second remote device. Thus, electronic device 100 may allow communication to take place between two remote devices that communicate using two, different communication protocols. However, electronic device 100 may comprise virtually any other electronic device that benefits from having an unlimited power source.

Referring back to FIG. 1, electronic device 100 may comprise electronic circuitry 102, for example, any combination of discreet components, integrated circuits, ASICs, wiring, connectors, memory devices, and other circuitry well-known in the art for allowing electronic device 100 to perform its intended function(s). Electronic circuitry is coupled to connector 104 via wiring 106. In one embodiment, connector 104 comprises a "male" portion of a USB type connector (see appendix A and B for details of a variety of USB connectors). In another embodiment, connector 104 comprises a "female" portion of a USB connector. Of course, connector 104 could comprise virtually any type of connector suitable for the size and power requirements of electronic device 100. Wiring 106 typically comprises a pair of insulated wires, although it could comprise traces on a circuit board, or virtually any other means for connecting connector 104 with electronic circuitry 102.

In practice, electronic device 100, including electronic circuitry 102, is powered via voltage and current received via connector 104 and wiring 106, supplied by an external power source, such as a commonly available power adapter, described in detail below.

Electronic device 100 may comprise virtually any shape or size, and be constructed of any common materials, such as plastic, synthetic polymer, metal, wood, and/or other materials. In one embodiment, electronic device 100 is 5 inches long by 4 inches wide, by 2 inches deep.

Figure 2:
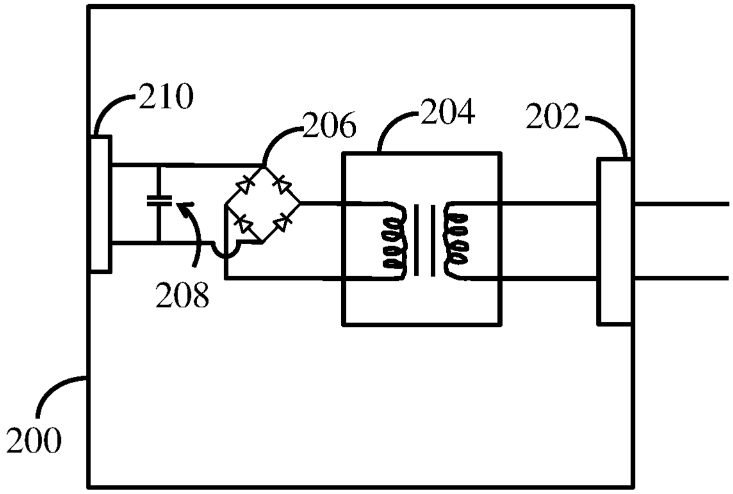
FIG. 2 is a schematic diagram illustrating the external power adapter shown in FIG. 1.

FIG. 2 is a schematic diagram illustrating an external power adapter 200 used in conjunction with electronic device 100. Power adapter 200 comprises AC connector 202 having two or three connection prongs for insertion into a typical 120 VAC outlet, or other readily available power outlet. AC voltage from the outlet is provided to transformer 204, which receives the AC power and, in conjunction with diode bridge 206 and capacitor 208, provides a stepped-down, DC voltage suitable for powering electronic circuitry 102. Of course, the diode bridge 206 and capacitor 208 could be replaced by other known electrical components used to convert AC power from transformer 204 into a voltage (either AC or DC) suitable for electronic circuitry 102. For example, electronic circuitry might require 5 volts DC, drawing a maximum power of 2 amps. Thus power adapter 200 comprises the necessary electrical components to convert the power supplied by the outlet to 5 volts DC at a maximum of 2 amps. In another embodiment, power adapter 200 may comprise additional circuitry, in one embodiment another diode bridge and capacitor, to supply a second voltage to electronic circuitry 102. In this case, wiring 106 comprises at least 3 wires to provide the two voltages produced by power adapter 200 to electronic circuitry 102. In other embodiments, more than 2 voltages may be generated by power adapter 200, using circuitry in addition to that shown in FIG. 2. Regardless of embodiment, converted power is provide to electronic circuitry 102 via connector 210 of power adapter 200 that connects to connector 104 of electronic device 100.

Figure 3:
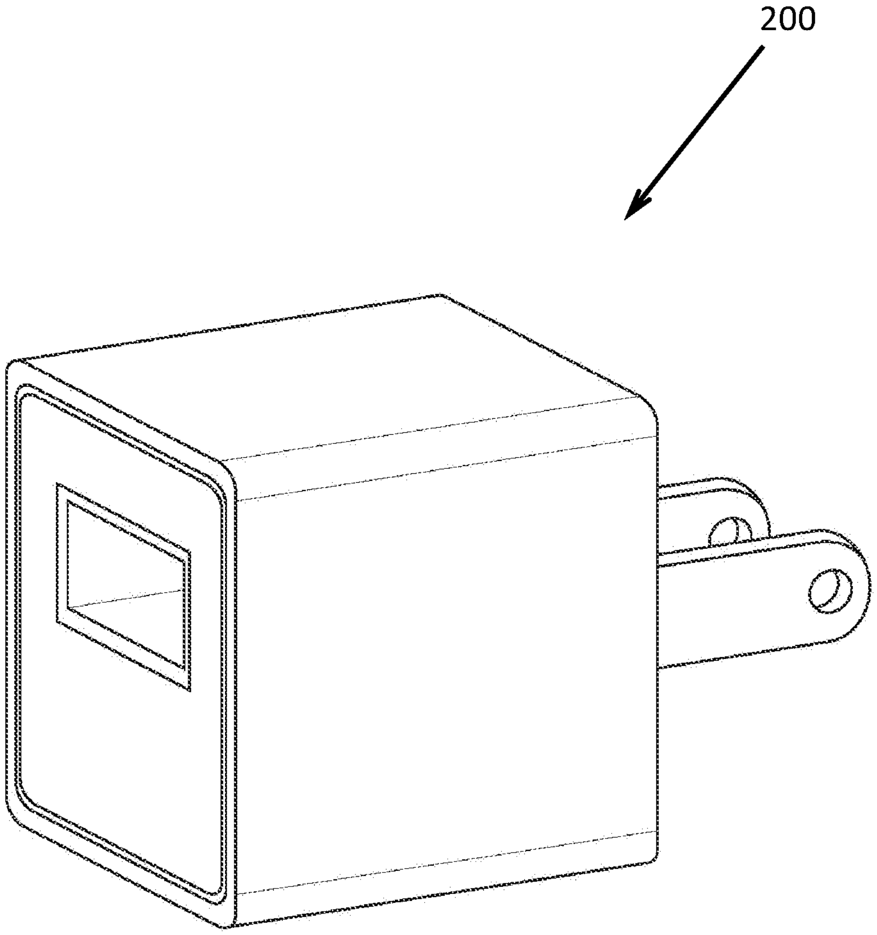
Prior Art FIG. 3
FIG. 3 is a perspective view of one embodiment of the power adapter shown in FIGS. 1 and 2.
Figure 4:
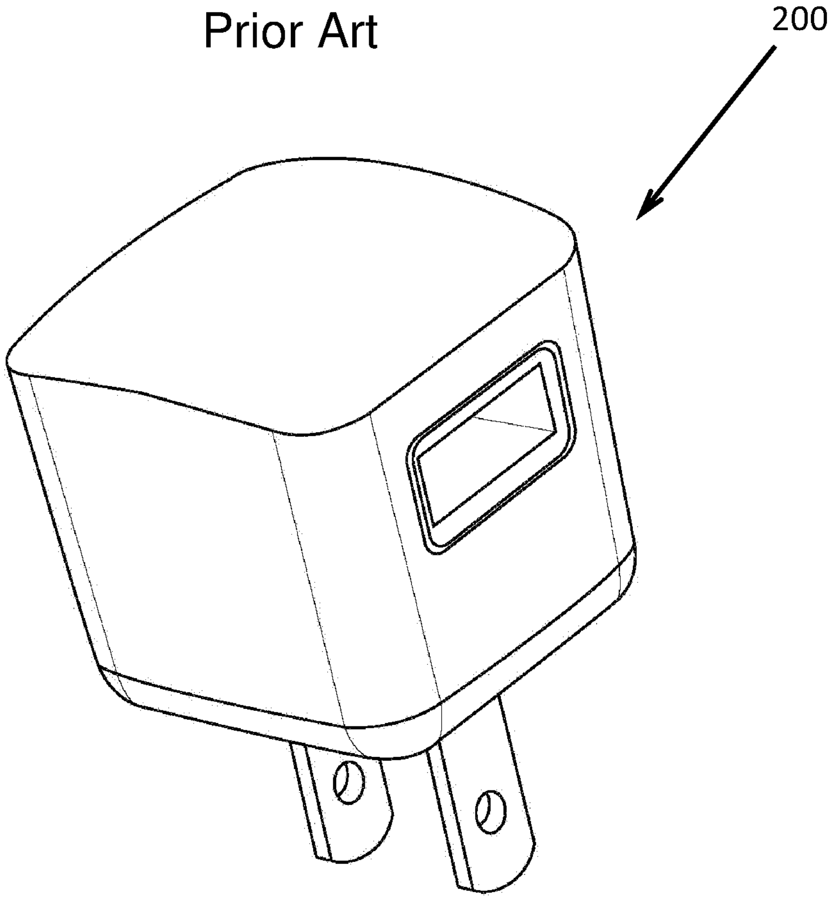
FIG. 4 is a perspective view of another embodiment of the power adapter shown in FIGS. 1 and 2.

In one embodiment, power adapter 200 comprises the well-known USB power adapter/charger Cube offered by Apple, Incorporated of Cupertino, California, shown in FIG. 3. In another embodiment, power adapter 200 comprises a Blackberry USB Power Plus, shown in FIG. 4. Of course, virtually any other compact power adapter could be used in the alternative.

Figure 5:
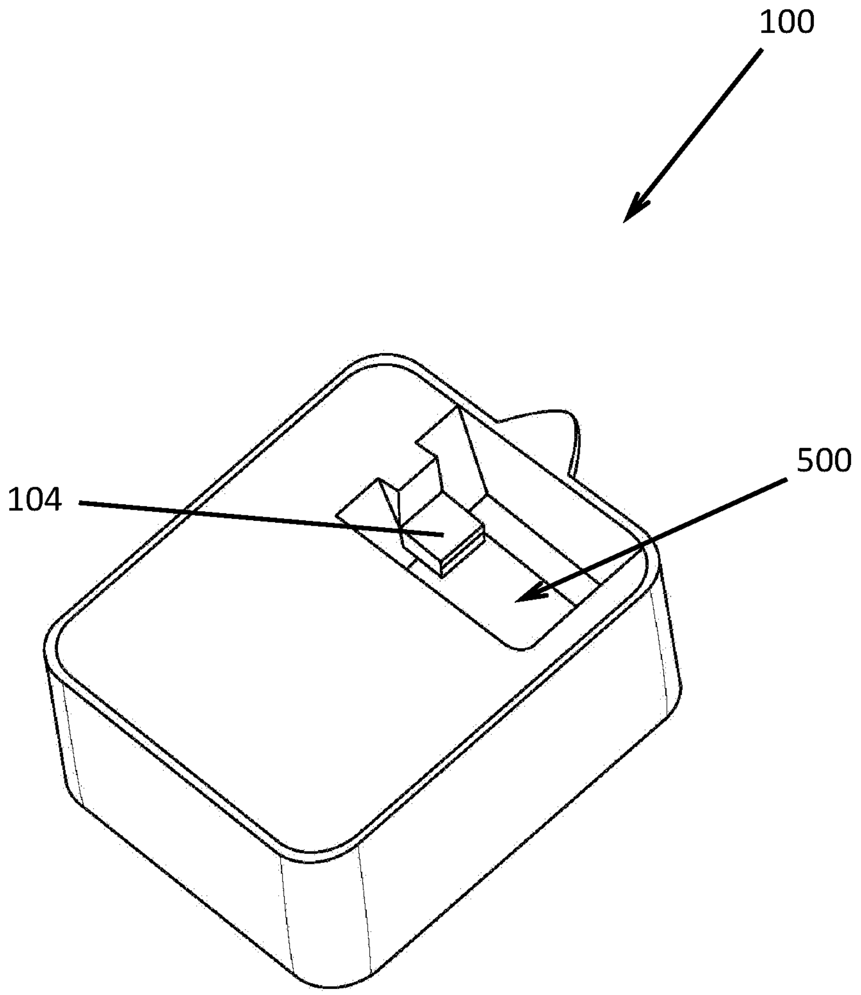
FIG. 5 is a perspective view of one embodiment of the electronic device described in FIG. 1.

FIG. 5 is a perspective view of one embodiment of electronic device 100, showing connector 104 (in this embodiment, a USB connector) recessed into a depression 500 formed into the surface of electronic device 100. The depression 500 is formed to allow power adapter 200 to be received therein, in one embodiment, such that the AC prongs extending from a body of power adapter 200 are the only portion of power adapter 200 extending out of the depression 500. In this way, power adapter 200 can be inserted into the depression 500, allowing connector 104 of electronic device 100 to engage connector 202 of power adapter 200. The formation of the depression 500 on electronic device 100 typically provides a snug fit between the depression 500 and body of power adapter 200.

Figure 6:
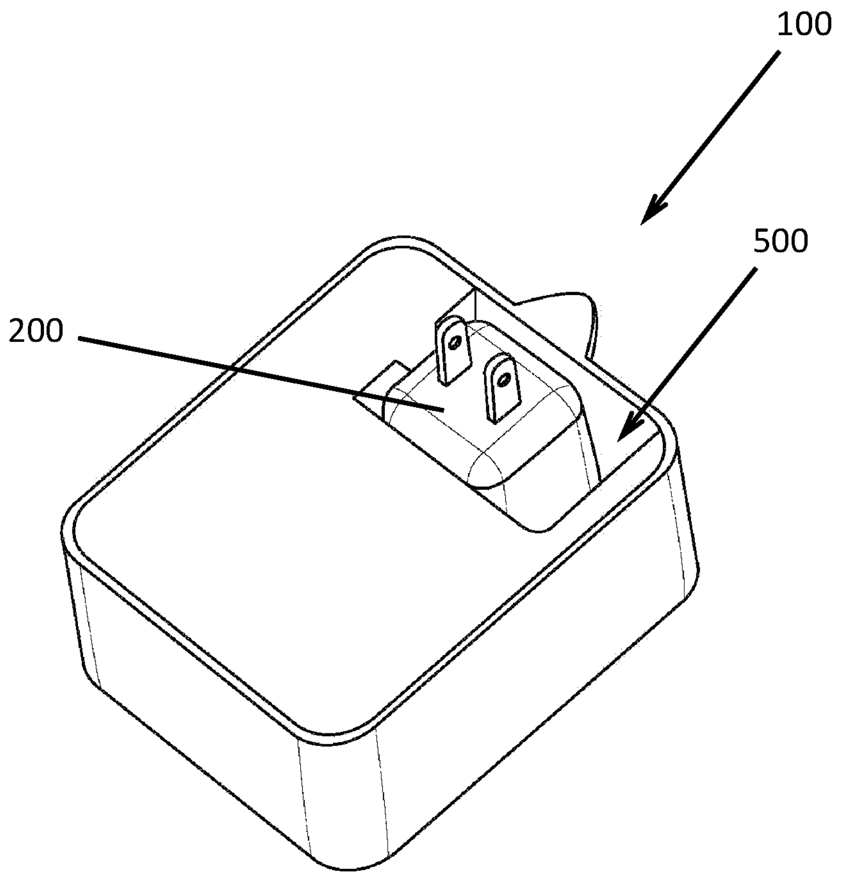
FIG. 6 is a perspective view of one embodiment of the electronic device of FIGS. 1, 2, and 5.

FIG. 6 is a perspective view of one embodiment of electronic device 100 with power adapter 200 inserted into the depression 500.

Figure 7:
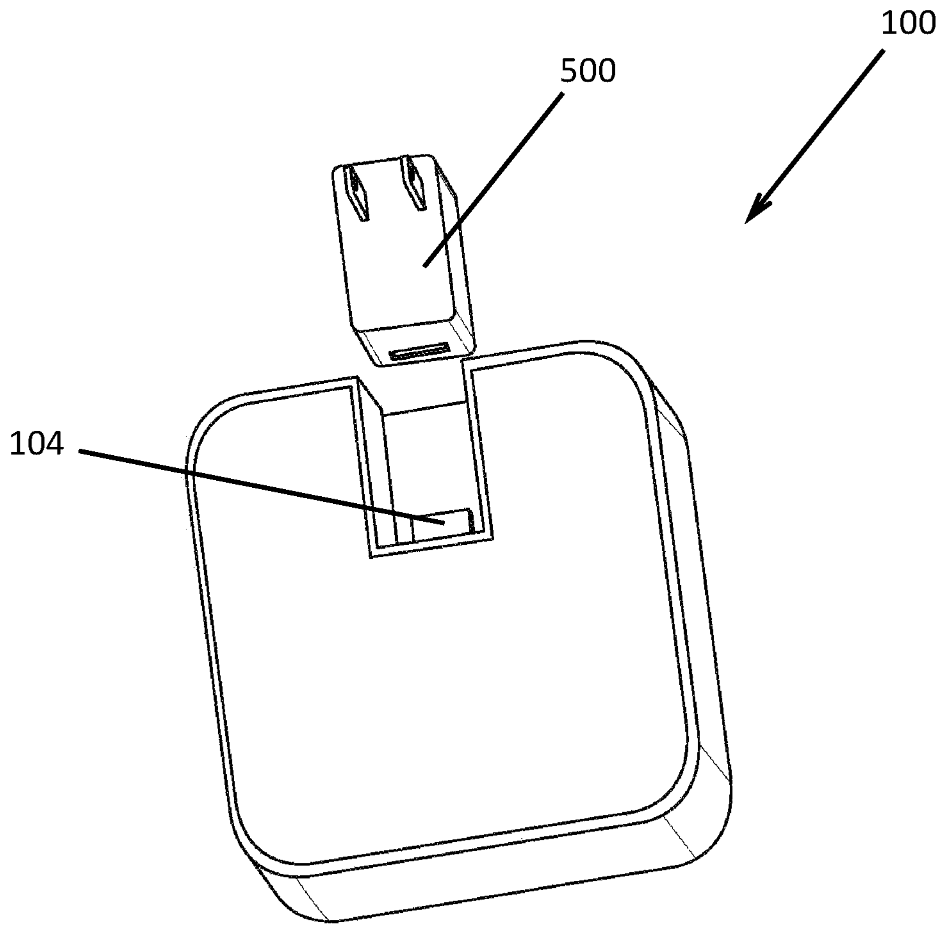
FIG. 7 is a perspective view of another embodiment of the electronic device of FIGS. 1, 2, and 5.

FIG. 7 is a perspective view of another embodiment of electronic device 100 having a cut-out formed in the housing 700 of the electronic device 100, rather than a depression, and power adapter 200 having its connector 210 located on an opposing side from connector 202. In this embodiment, power adapter 200 may connected to electronic device 100 by sliding it into the cut-out, whereupon connector 210 engages connector 104. The cut-out is sized and shaped to receive the power adapter 200.

Naturally, all examples discussed herein are merely illustrative and should not be construed to limit the scope of the inventive technology consistent with the broader inventive principles disclosed. As may be easily understood from the foregoing, the basic concepts of the present inventive technology may be embodied in a variety of ways. In addition, while some devices are disclosed, it should be understood that these not only accomplish certain methods but also can be varied in a number of ways. Importantly, as to all of the foregoing, all of these facets should be understood to be encompassed by this disclosure.

It should also be understood that a variety of changes to the inventive concepts discussed herein may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Any priority case(s) claimed by this application is hereby appended and hereby incorporated herein by reference in its entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. An electronic device, comprising:

a housing for containing electronic circuitry;

a depression formed into the housing, sized and shaped to receive and releasably contain a power adapter within the depression, the power adapter comprising a case, a prong connector for receiving household AC voltage from an electrical outlet, and an output connector for providing an output voltage lower than the household AC voltage; and a connector coupled to the electronic circuitry, for receiving the output voltage from the power adapter when the power adapter is installed into the depression, the output voltage used to power the electronic circuitry.

2. The electronic device of claim 1, wherein the depression is sized and shaped such that only the prong connector extends from the housing when the power adapter is installed into the depression.

3. The electronic device of claim 1, wherein the depression forms a side wall, the side wall comprising an opening through which the connector extends into the depression.

4. The electronic device of claim 1, wherein the output voltage comprises a DC voltage.

5. The electronic device of claim 1, wherein the output voltage comprises an AC voltage.

6. The electronic device of claim 1, wherein the output connector comprises a female USB port and the connector comprises a male USB connector.

7. The electronic device of claim 1, wherein the power adapter comprises a USB power adapter/charger Cube.

8. The electronic device of claim 1, wherein the depression is formed into a side wall of the housing, sized and shaped to slidably receive the power adapter into the depression.

9. A system for powering an electronic device lacking a power supply, comprising:

an external power adapter, the power adapter comprising a prong connector for receiving household AC voltage from an electrical outlet and an output connector for providing an output voltage lower than the household AC voltage; and the electronic device, comprising:

a housing for containing electronic circuitry;

a depression formed into the housing, sized and shaped to receive and removably contain the external power adapter; and a connector, coupled to the electronic circuitry, for receiving the output voltage from the power adapter when the power adapter is installed into the depression, the output voltage used to power the electronic circuitry.

10. The electronic device of claim 9, wherein the external power adapter lacks any external wires.

11. The electronic device of claim 9, wherein the depression is sized and shaped such that only the prong connector extends from the housing when the power adapter is installed into the depression.

12. The electronic device of claim 9, wherein the depression forms a side wall, the side wall comprising an opening through which the connector extends into the depression.

13. The electronic device of claim 9, wherein the power adapter comprises a USB power adapter/charger Cube.

14. The electronic device of claim 9, wherein the depression is formed into a side wall of the housing, sized and shaped to slidably receive the power adapter into the depression.

* * * * *